(12) United States Patent
Ishikawa

(10) Patent No.: US 11,312,860 B2
(45) Date of Patent: Apr. 26, 2022

(54) POLYCARBONATE-BASED RESIN COMPOSITION AND MOLDED ARTICLE THEREOF

(71) Applicant: IDEMITSU KOSAN CO., LTD., Tokyo (JP)

(72) Inventor: Yasuhiro Ishikawa, Ichihara (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 12 days.

(21) Appl. No.: 16/622,760

(22) PCT Filed: Jun. 26, 2018

(86) PCT No.: PCT/JP2018/024175
§ 371 (c)(1),
(2) Date: Dec. 13, 2019

(87) PCT Pub. No.: WO2019/004200
PCT Pub. Date: Jan. 3, 2019

(65) Prior Publication Data
US 2021/0147685 A1  May 20, 2021

(30) Foreign Application Priority Data

Jun. 28, 2017  (JP) .............................. JP2017-126706

(51) Int. Cl.
*C08L 83/10* (2006.01)
*C08L 67/02* (2006.01)
*C08L 69/00* (2006.01)

(52) U.S. Cl.
CPC ............... *C08L 83/10* (2013.01); *C08L 67/02* (2013.01); *C08L 69/00* (2013.01); *C08L 2205/025* (2013.01); *C08L 2205/035* (2013.01)

(58) Field of Classification Search
CPC ...................................................... C08L 83/10
See application file for complete search history.

(56) References Cited

U.S. PATENT DOCUMENTS

2010/0129649 A1* 5/2010 Malinoski ............. C08L 69/005
428/339
2012/0288654 A1 11/2012 Gallucci et al.

2014/0200303 A1 7/2014 Steendam et al.
2015/0322259 A1* 11/2015 Chin ....................... C08K 7/14
523/435
2018/0230305 A1* 8/2018 Okamoto ............. C08G 77/448

FOREIGN PATENT DOCUMENTS

| CN | 102227473 A | 10/2011 |
| JP | H03-97752 A | 4/1991 |
| JP | 2001-040203 A | 2/2001 |
| JP | 2002-012755 A | 1/2002 |
| JP | 2006-232956 A | 9/2006 |
| JP | 2008-095046 | 4/2008 |
| JP | 2013-139501 A | 7/2013 |
| JP | 2015-059138 A | 3/2015 |
| JP | 2015-193771 A | 11/2015 |
| WO | WO-2007/132596 A1 | 11/2007 |
| WO | WO-2009/037974 A1 | 3/2009 |
| WO | WO-2015/128768 A1 | 9/2015 |

OTHER PUBLICATIONS

International Searching Authority, "International Search Report," issued in connection with International Patent Application No. PCT/JP2018/024175, dated Aug. 28, 2018.
Office Action dated Sep. 21, 2021 issued in a corresponding Japanese Patent Application No. 2019-526931, (9 pages).
Office Action dated Jan. 6, 2022 issued in a corresponding Chinese Patent Application No. 201880042771.3, (6 pages).
Japanese Office Action dated Feb. 18, 2022 and its English translation.
Japanese Office Action dated Mar. 1, 2022 and its English translation.

* cited by examiner

Primary Examiner — Jeffrey C Mullis
(74) Attorney, Agent, or Firm — Foley & Lardner LLP

(57) ABSTRACT

Provided is a polycarbonate-based resin composition, including: 50 mass % or more to 99 mass % or less of a polycarbonate-based resin (S) containing 0.1 mass % or more to 100 mass % or less of a polycarbonate-polyorganosiloxane copolymer (A), which contains a polycarbonate block (A-1) formed of a specific repeating unit and a polyorganosiloxane block (A-2) containing a specific repeating unit, and 0 mass % or more to 99.9 mass % or less of an aromatic polycarbonate-based resin (B) except the polycarbonate-polyorganosiloxane copolymer (A); and 1 mass % or more to 50 mass % or less of a polyester-based resin (C), wherein the polyorganosiloxane block (A-2) has an average chain length of from 20 or more to less than 50, and a 3-millimeter thick plate formed of the polycarbonate-based resin composition has a total light transmittance of 80% or more.

12 Claims, No Drawings

POLYCARBONATE-BASED RESIN COMPOSITION AND MOLDED ARTICLE THEREOF

TECHNICAL FIELD

The present invention relates to a polycarbonate-based resin composition, and a molded article thereof.

BACKGROUND ART

A polycarbonate resin (hereinafter sometimes abbreviated as "PC resin") has been known as a resin having extremely high impact resistance and satisfactory heat resistance among engineering plastics. Accordingly, the resin has been used in various fields including the fields of OA equipment, information and communication equipment, and household electric equipment. However, the resin has a drawback in that the resin is poor in chemical resistance.

The following has been proposed as one method of improving the chemical resistance of the polycarbonate resin (Patent Document 1). The polycarbonate resin is turned into a polymer alloy together with, for example, a thermoplastic polyester resin typified by a polybutylene terephthalate resin or a polyethylene terephthalate resin.

In Patent Document 1, there is a proposal of the addition of a phosphate compound for preventing reductions in physical properties of the resin due to the polymer alloy production.

CITATION LIST

Patent Document

Patent Document 1: JP 03-097752 A

SUMMARY OF INVENTION

Technical Problem

In Patent Document 1, however, no particular improvement in transparency of the resin has been performed. Further, the impact resistance of the resultant polymer alloy is still insufficient, and no reference has been made to the chemical resistance thereof.

Solution to Problem

The inventor of the present invention has made an investigation with a view to obtaining a polycarbonate-based resin composition having more excellent impact resistance, more excellent chemical resistance, and more excellent transparency. As a result, the inventor has found that a polycarbonate-based resin composition including a polycarbonate-based resin containing a specific polycarbonate-polyorganosiloxane copolymer and a polyester-based resin solves the above-mentioned problems.

That is, the present invention relates to the following items [1] to [13].

[1] A polycarbonate-based resin composition, comprising: 50 mass % or more to 99 mass % or less of a polycarbonate-based resin (S) containing 0.1 mass % or more to 100 mass % or less of a polycarbonate-polyorganosiloxane copolymer (A), which contains a polycarbonate block (A-1) formed of a repeating unit represented by the following general formula (I) and a polyorganosiloxane block (A-2) containing a repeating unit represented by the following general formula (II), and 0 mass % or more to 99.9 mass % or less of an aromatic polycarbonate-based resin (B) except the polycarbonate-polyorganosiloxane copolymer (A); and 1 mass % or more to 50 mass % or less of a polyester-based resin (C), wherein the polyorganosiloxane block (A-2) has an average chain length of from 20 or more to less than 50, and a 3-millimeter thick plate formed of the polycarbonate-based resin composition has a total light transmittance of 80% or more:

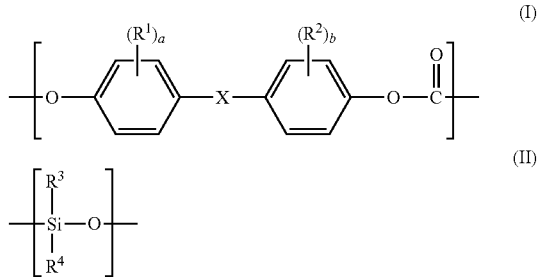

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and "a" and "b" each independently represent an integer of from 0 to 4.

[2] The polycarbonate-based resin composition according to the above-mentioned item [1], wherein the aromatic polycarbonate-based resin (B) contains a polycarbonate block including, in a main chain thereof, a repeating unit represented by the following general formula (III):

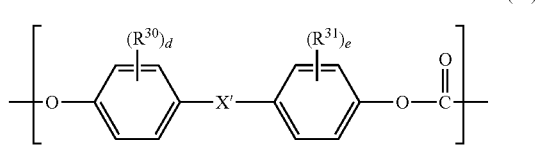

wherein $R^{30}$ and $R^{31}$ each independently represent a halogen atom, an alkyl group having 1 to 6 carbon atoms, or an alkoxy group having 1 to 6 carbon atoms, X' represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and "d" and "e" each independently represent an integer of from 0 to 4.

[3] The polycarbonate-based resin composition according to the item [1] or [2], wherein a content of the polyorganosiloxane block (A-2) in the polycarbonate-polyorganosiloxane copolymer (A) is from 1 mass % or more to 12 mass % or less.

[4] The polycarbonate-based resin composition according to any one of the items [1] to [3], wherein a content of the polyorganosiloxane block (A-2) in the polycarbonate-based resin (S) is from 0.1 mass % or more to 10 mass % or less.

[5] The polycarbonate-based resin composition according to any one of the items [1] to [4], wherein the polycarbonate-polyorganosiloxane copolymer (A) has a viscosity-average molecular weight (Mv) of from 9,000 or more to 50,000 or less.

[6] The polycarbonate-based resin composition according to any one of the items [1] to [5], wherein the polycarbonate-based resin (S) has a viscosity-average molecular weight (Mv) of from 9,000 or more to 50,000 or less.

[7] The polycarbonate-based resin composition according to any one of the items [1] to [6], wherein the polyester-based resin (C) comprises at least one selected from a polyethylene terephthalate and a polybutylene terephthalate.

[8] The polycarbonate-based resin composition according to the item [7], wherein the polyester-based resin (C) is a polyethylene terephthalate.

[9] The polycarbonate-based resin composition according to any one of the items [1] to [8], wherein the polycarbonate-based resin composition is free of a fluorine-containing flame retardant aid.

[10] The polycarbonate-based resin composition according to any one of the items [1] to [9], wherein the polycarbonate-based resin composition is free of an inorganic filler.

[11] A molded article, which is obtained by molding the polycarbonate-based resin composition of any one of the items [1] to [10].

[12] The molded article according to the item [11], wherein the molded article comprises exterior and internal parts for parts for electrical and electronic equipment.

[13] The molded article according to the item [11], wherein the molded article comprises parts for an automobile and a building material.

Advantageous Effects of Invention

According to the present invention, the polycarbonate-based resin composition having more excellent impact resistance, more excellent chemical resistance, and more excellent transparency, and the molded article thereof can be obtained.

DESCRIPTION OF EMBODIMENTS

The inventor of the present invention has made extensive investigations, and as a result, has found the following surprising result. When a polycarbonate-polyorganosiloxane copolymer having a polyorganosiloxane block having a chain length range required in the present invention is used alone, the copolymer is comparable in transparency to a general polycarbonate-based resin free of such polyorganosiloxane block. In the present invention, however, it has been found that, when a resin composition including the polycarbonate-polyorganosiloxane copolymer having a polyorganosiloxane block having a specific chain length range and a polyester-based resin is produced, the composition provides transparency more excellent than that of a resin composition including the general polycarbonate-based resin and the polyester-based resin while having excellent impact resistance and excellent chemical resistance. Detailed description is given below.

The term "XX to YY" as used herein means "from XX or more to YY or less." In this description, a specification considered to be preferred may be arbitrarily adopted, and a combination of preferred specifications is more preferred.

<Polycarbonate-Polyorganosiloxane Copolymer (A)>

A polycarbonate-polyorganosiloxane copolymer (A) (hereinafter sometimes abbreviated as "PC-POS copolymer") to be incorporated into a polycarbonate-based resin composition of the present invention has the following features: the copolymer contains a polycarbonate block (A-1) formed of a repeating unit represented by the following general formula (I) and a polyorganosiloxane block (A-2) containing a repeating unit represented by the following general formula (II); and the polyorganosiloxane block (A-2) has an average chain length of from 20 or more to less than 50:

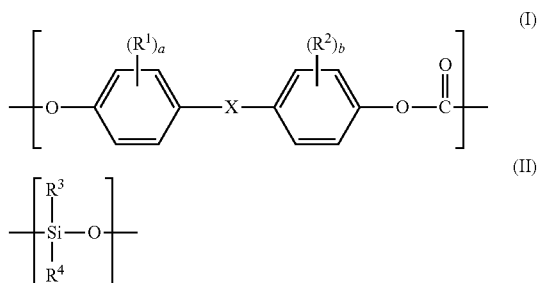

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and "a" and "b" each independently represent an integer of from 0 to 4.

In the general formula (I), examples of the halogen atom that $R^1$ and $R^2$ each independently represent include a fluorine atom, a chlorine atom, a bromine atom, and an iodine atom.

Examples of the alkyl group that $R^1$ and $R^2$ each independently represent include a methyl group, an ethyl group, a n-propyl group, an isopropyl group, various butyl groups (the term "various" means that a linear group and all kinds of branched groups are included, and in this description, the same applies hereinafter), various pentyl groups, and various hexyl groups. Examples of the alkoxy group that $R^1$ and $R^2$ each independently represent include alkoxy groups having the above-mentioned alkyl groups as alkyl group moieties.

Examples of the alkylene group represented by X include a methylene group, an ethylene group, a trimethylene group, a tetramethylene group, and a hexamethylene group. Among them, an alkylene group having 1 to 5 carbon atoms is preferred. Examples of the alkylidene group represented by X include an ethylidene group and an isopropylidene group. Examples of the cycloalkylene group represented by X include a cyclopentanediyl group, a cyclohexanediyl group, and a cyclooctanediyl group. Among them, a cycloalkylene group having 5 to 10 carbon atoms is preferred. Examples of the cycloalkylidene group represented by X include a cyclohexylidene group, a 3,5,5-trimethylcyclohexylidene group, and a 2-adamantylidene group. Among them, a cycloalkylidene group having 5 to 10 carbon atoms is preferred, and a cycloalkylidene group having 5 to 8 carbon atoms is more preferred. Examples of the aryl moiety of the arylalkylene group represented by X include aryl groups each having 6 to 14 ring-forming carbon atoms, such as a phenyl group, a naphthyl group, a biphenyl group, and an anthryl group, and examples of the alkylene group include the above-mentioned alkylene groups. Examples of the aryl moiety of the arylalkylidene group represented by X include aryl groups each having 6 to 14 ring-forming carbon atoms, such as a phenyl group, a naphthyl group, a biphenyl group, and an anthryl group, and examples of the alkylidene group may include the above-mentioned alkylidene groups.

"a" and "b" each independently represent an integer of from 0 to 4, preferably from 0 to 2, more preferably 0 or 1.

Among them, a repeating unit in which "a" and "b" each represent 0, and X represents a single bond or an alkylene group having 1 to 8 carbon atoms, or a repeating unit in which "a" and "b" each represent 0, and X represents an alkylene group having 3 carbon atoms, in particular an isopropylidene group is suitable.

In the general formula (II), examples of the halogen atom represented by $R^3$ or $R^4$ include a fluorine atom, a chlorine atom, a bromine atom, and an iodine atom. Examples of the alkyl group represented by $R^3$ or $R^4$ include a methyl group, an ethyl group, a n-propyl group, an isopropyl group, various butyl groups, various pentyl groups, and various hexyl groups. Examples of the alkoxy group represented by $R^3$ or $R^4$ include alkoxy groups having the above-mentioned alkyl groups as alkyl group moieties. Examples of the aryl group represented by $R^3$ or $R^4$ include a phenyl group and a naphthyl group.

$R^3$ and $R^4$ each preferably represent a hydrogen atom, an alkyl group having 1 to 6 carbon atoms, an alkoxy group having 1 to 6 carbon atoms, or an aryl group having 6 to 12 carbon atoms, and each more preferably represent a methyl group.

More specifically, the polyorganosiloxane block (A-2) containing the repeating unit represented by the general formula (II) preferably has a unit represented by any one of the following general formulae (II-I) to (II-III):

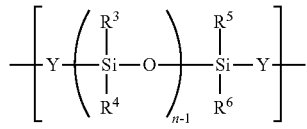

(II-I)

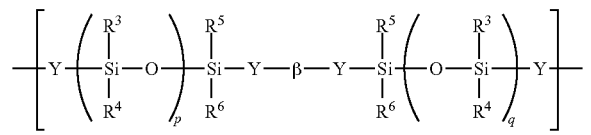

(II-II)

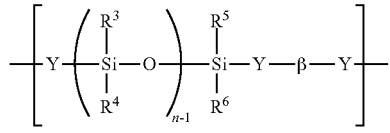

(II-III)

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$, $R^4$, $R^5$, or $R^6$ may be identical to or different from each other, Y represents —$R^7$O—, —$R^7$COO—, —$R^7$NH—, —$R^7$NR$^8$—, —COO—, —S—, —$R^7$COO—$R^9$—O—, or —$R^7$O—$R^{10}$—O—, and a plurality of Y may be identical to or different from each other, the $R^7$ represents a single bond, a linear, branched, or cyclic alkylene group, an aryl-substituted alkylene group, a substituted or unsubstituted arylene group, or a diarylene group, $R^8$ represents an alkyl group, an alkenyl group, an aryl group, or an aralkyl group, $R^9$ represents a diarylene group, $R^{10}$ represents a linear, branched, or cyclic alkylene group, or a diarylene group, β represents a divalent group derived from a diisocyanate compound, or a divalent group derived from a dicarboxylic acid or a halide of a dicarboxylic acid, "n" represents the chain length of the polyorganosiloxane and represents from 20 or more to less than 50, and n−1, and "p" and "q" each represent the number of repetitions of a polyorganosiloxane unit and each represent an integer of 1 or more, and the sum of "p" and "q" is n−2.

Examples of the halogen atom that $R^3$ to $R^6$ each independently represent include a fluorine atom, a chlorine atom, a bromine atom, and an iodine atom. Examples of the alkyl group that $R^3$ to $R^6$ each independently represent include a methyl group, an ethyl group, a n-propyl group, an isopropyl group, various butyl groups, various pentyl groups, and various hexyl groups. Examples of the alkoxy group that $R^3$ to $R^6$ each independently represent include alkoxy groups having the above-mentioned alkyl groups as alkyl group moieties.

Examples of the aryl group that $R^3$ to $R^6$ each independently represent include a phenyl group and a naphthyl group.

$R^3$ to $R^6$ each preferably represent a hydrogen atom, an alkyl group having 1 to 6 carbon atoms, an alkoxy group having 1 to 6 carbon atoms, or an aryl group having 6 to 12 carbon atoms.

$R^3$ to $R^6$ in the general formula (II-I), the general formula (II-II), and/or the general formula (II-III) each preferably represent a methyl group.

The linear or branched alkylene group represented by $R^7$ in —$R^7$O—, —$R^7$COO—, —$R^7$NH—, —$R^7$NR$^8$—, —$R^7$COO—$R^9$—O—, or —$R^7$O—$R^{10}$—O— represented by Y is, for example, an alkylene group having 1 to 8 carbon atoms, preferably 1 to 5 carbon atoms. The cyclic alkylene group represented by $R^7$ is, for example, a cycloalkylene group having 5 to 15 carbon atoms, preferably 5 to 10 carbon atoms.

The aryl-substituted alkylene group represented by $R^7$ may have a substituent, such as an alkoxy group or an alkyl group, on its aromatic ring, and a specific structure thereof may be, for example, a structure represented by the following general formula (i) or (ii). Herein, when $R^7$ represents the aryl-substituted alkylene group, the alkylene group is bonded to Si.

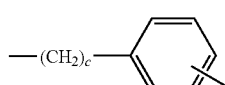

(i)

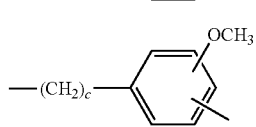

(ii)

wherein "c" represents a positive integer and typically represents an integer of from 1 to 6.

The diarylene group represented by any one of $R^7$, $R^9$, and $R^{10}$ refers to a group in which two arylene groups are linked to each other directly or through a divalent organic group, and is specifically a group having a structure represented by —$Ar^1$—W—$Ar^2$—. $Ar^1$ and $Ar^2$ each represent an arylene group, and W represents a single bond or a divalent organic group. Examples of the divalent organic group represented by W include an isopropylidene group, a methylene group, a dimethylene group, and a trimethylene group.

Examples of the arylene group represented by any one of $R^7$, $Ar^1$, and $Ar^2$ include arylene groups each having 6 to 14 ring-forming carbon atoms, such as a phenylene group, a naphthylene group, a biphenylene group, and an anthrylene group. Those arylene groups may each have an arbitrary substituent, such as an alkoxy group or an alkyl group.

The alkyl group represented by $R^8$ is a linear or branched group having 1 to 8, preferably 1 to 5 carbon atoms. The alkenyl group represented by $R^8$ is, for example, a linear or branched group having 2 to 8, preferably 2 to 5 carbon atoms. The aryl group represented by $R^8$ is, for example, a phenyl group or a naphthyl group. The aralkyl group represented by $R^8$ is, for example, a phenylmethyl group or a phenylethyl group.

The linear, branched, or cyclic alkylene group represented by $R^{10}$ is the same as that represented by $R^7$.

Y preferably represents —$R^7$O—. $R^7$ preferably represents an aryl-substituted alkylene group, in particular a residue of a phenol-based compound having an alkyl group, and more preferably represents an organic residue derived from allyl phenol or an organic residue derived from eugenol.

With regard to "p" and "q" in the formula (II-II), it is preferred that p=q.

β represents a divalent group derived from a diisocyanate compound, or a divalent group derived from a dicarboxylic acid or a halide of a dicarboxylic acid, and examples thereof include divalent groups represented by the following general formulae (iii) to (vii).

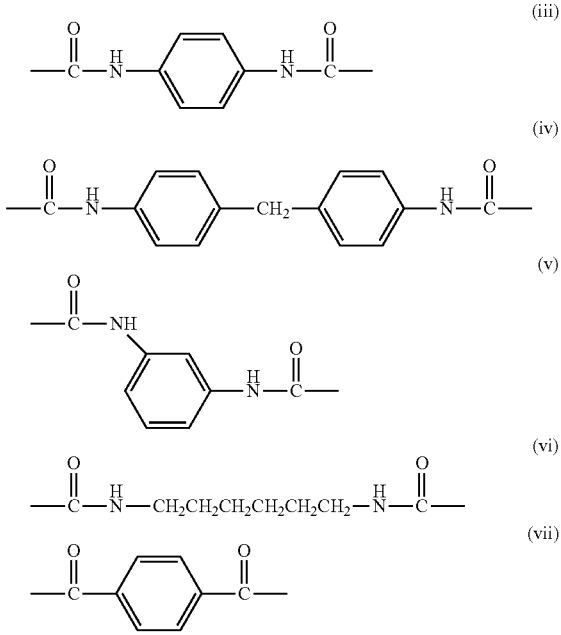

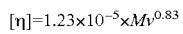

The average chain length "n" of the polyorganosiloxane block (A-2) in the PC-POS copolymer (A) needs to be from 20 or more to less than 50. "n" in each of the formulae (II-I) and (II-III) is from 20 or more to less than 50, and in the case of the formula (II-II), a number obtained by adding 2 to the sum of "p" and "q" falls within the range. The average chain length is calculated by nuclear magnetic resonance (NMR) measurement. When the average chain length of the polycarbonate-polyorganosiloxane copolymer (A) is from 20 or more to less than 50, the polycarbonate-based resin composition to be finally obtained is excellent in impact resistance and the like, and is also excellent in transparency.

The average chain length of the polyorganosiloxane block (A-2) is preferably 30 or more, more preferably 35 or more. The average chain length is preferably 49 or less, more preferably 45 or less.

The content of the polyorganosiloxane block (A-2) in the PC-POS copolymer (A) is preferably from 1 mass % or more to 12 mass % or less. When the content of the polyorganosiloxane block in the PC-POS copolymer (A) falls within the range, more excellent impact resistance and more excellent transparency can be obtained.

The content of the polyorganosiloxane block (A-2) in the PC-POS copolymer (A) is more preferably 2 mass % or more, still more preferably 3 mass % or more, particularly preferably 4 mass % or more, and is preferably 10 mass % or less, more preferably 9 mass % or less, still more preferably 8 mass % or less.

The viscosity-average molecular weight (Mv) of the PC-POS copolymer (A) may be appropriately adjusted by using, for example, a molecular weight modifier (terminal stopper) so as to be a target molecular weight in accordance with applications or products in which the copolymer is used. The viscosity-average molecular weight of the PC-POS copolymer (A) is preferably from 9,000 or more to 50,000 or less. When the viscosity-average molecular weight is 9,000 or more, a sufficient strength of a molded article can be obtained. When the viscosity-average molecular weight is 50,000 or less, injection molding or extrusion molding can be performed at the temperature at which the heat deterioration of the copolymer does not occur.

The viscosity-average molecular weight of the PC-POS copolymer (A) is more preferably 12,000 or more, still more preferably 14,000 or more, particularly preferably 16,000 or more, and is more preferably 30,000 or less, still more preferably 23,000 or less, particularly preferably 22,000 or less, most preferably 20,000 or less.

The viscosity-average molecular weight (Mv) is a value calculated from the following Schnell's equation by measuring the limiting viscosity [η] of a methylene chloride solution at 20° C.

$$[\eta]=1.23\times10^{-5}\times Mv^{0.83}$$

The polycarbonate-polyorganosiloxane copolymer (A) may be produced by a known production method, such as an interfacial polymerization method (phosgene method), a pyridine method, or an ester exchange method. Particularly when the interfacial polymerization method is adopted, a step of separating an organic phase containing the PC-POS copolymer (A) and an aqueous phase containing an unreacted product, a catalyst residue, or the like becomes easier, and hence the separation of the organic phase containing the PC-POS copolymer (A) and the aqueous phase in each washing step based on, for example, alkali washing, acid washing, or pure water washing becomes easier. Accordingly, the PC-POS copolymer (A) is efficiently obtained. With regard to a method of producing the PC-POS copolymer (A), reference may be made to, for example, a method described in JP 2014-80462 A.

Specifically, the PC-POS copolymer (A) may be produced by: dissolving a polycarbonate oligomer produced in advance to be described later and a polyorganosiloxane in a water-insoluble organic solvent (e.g., methylene chloride); adding a solution of a dihydric phenol-based compound (e.g., bisphenol A) in an aqueous alkali compound (e.g., aqueous sodium hydroxide) to the solution; and subjecting the mixture to an interfacial polycondensation reaction through the use of a tertiary amine (e.g., triethylamine) or a quaternary ammonium salt (e.g., trimethylbenzylammonium chloride) as a polymerization catalyst in the presence of a terminal stopper (a monohydric phenol, such as p-tert-butylphenol). In addition, the PC-POS copolymer (A) may also be produced by copolymerizing the polyorganosiloxane and a dihydric phenol, and phosgene, a carbonate ester, or a chloroformate.

A polyorganosiloxane represented by the following general formula (1), general formula (2), and/or general formula (3) may be used as the polyorganosiloxane serving as a raw material:

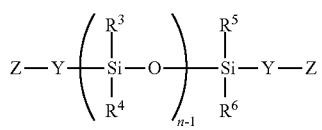
(1)

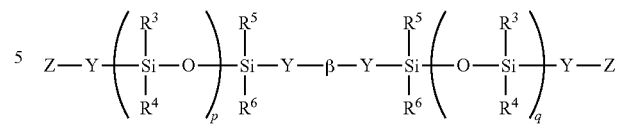
(2)

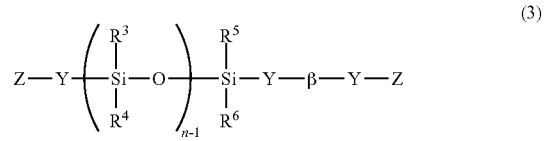
(3)

wherein $R^3$ to $R^6$, Y, β, n–1, "p", and "q" are as described above, and specific examples and preferred examples thereof are also the same as those described above, and Z represents a hydrogen atom or a halogen atom, and a plurality of Z may be identical to or different from each other.

Examples of the polyorganosiloxane represented by the general formula (1) include compounds each represented by any one of the following general formulae (1-1) to (1-11):

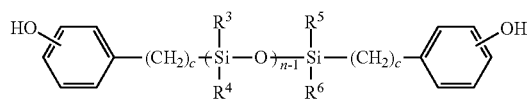
(1-1)

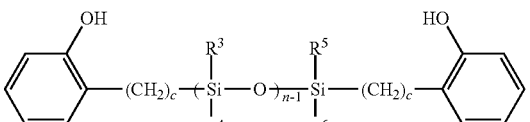
(1-2)

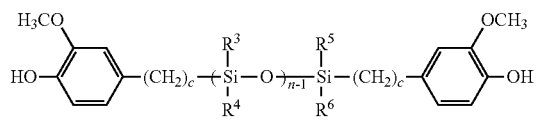
(1-3)

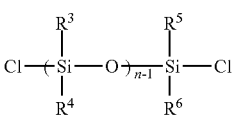
(1-4)

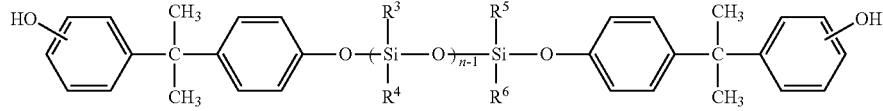
(1-5)

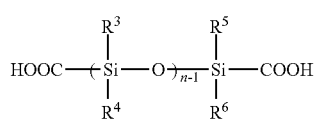
(1-6)

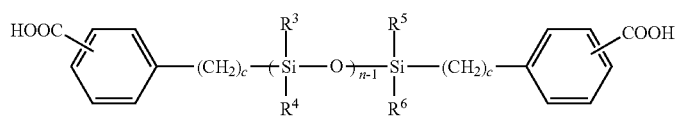
(1-7)

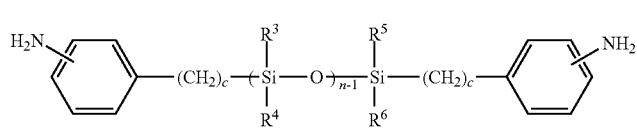
(1-8)

-continued

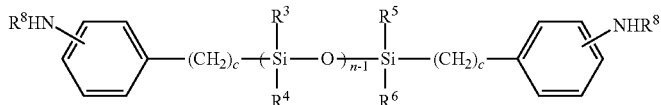
(1-9)

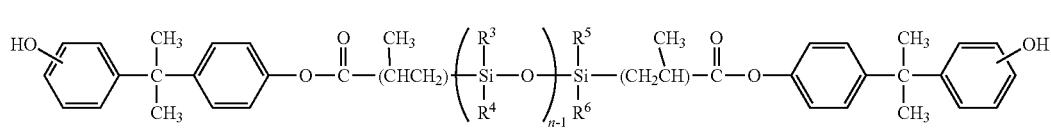
(1-10)

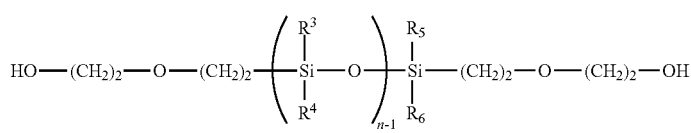
(1-11)

wherein in the general formulae (1-1) to (1-11), $R^3$ to $R^6$, "n", and $R^8$ are as defined above, and preferred examples thereof are also the same as those described above, and "c" represents a positive integer and typically represents an integer of from 1 to 6.

Among them, a phenol-modified polyorganosiloxane represented by the general formula (1-1) is preferred from the viewpoint of its ease of polymerization. In addition, an α,ω-bis[3-(o-hydroxyphenyl)propyl]polydimethylsiloxane, which is one compound represented by the general formula (1-2), or an α,ω-bis[3-(4-hydroxy-3-methoxyphenyl)propyl]polydimethylsiloxane, which is one compound represented by the general formula (1-3), is preferred from the viewpoint of its ease of availability.

In addition to the above, a compound having a structure represented by the following general formula (4) may be used as a polyorganosiloxane raw material:

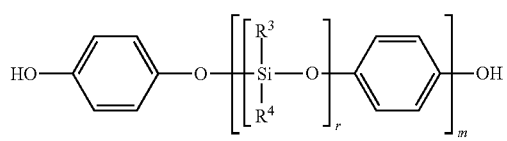
(4)

wherein $R^3$ and $R^4$ are identical to those described above. The average chain length of the polyorganosiloxane block represented by the general formula (4) is (r×m), and the range of the (r×m) is the same as that of the "n".

When the compound represented by the general formula (4) is used as a polyorganosiloxane raw material, the polyorganosiloxane block (A-2) preferably has a unit represented by the following general formula (II-IV):

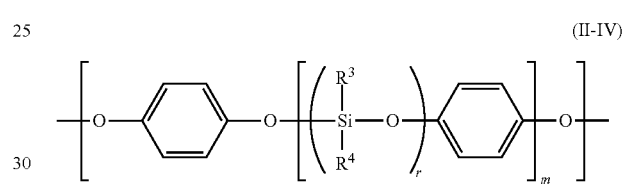
(II-IV)

wherein $R^3$, $R^4$, "r", and "m" are as described above.

The copolymer may include a structure represented by the following general formula (II-V) as the polyorganosiloxane block (A-2):

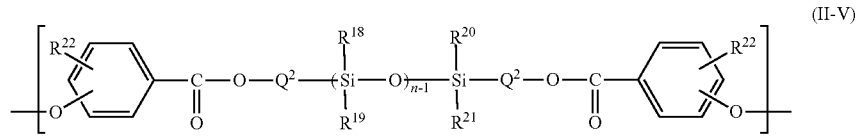
(II-V)

wherein $R^{18}$ to $R^{21}$ each independently represent a hydrogen atom or an alkyl group having 1 to 13 carbon atoms, $R^{22}$ represents an alkyl group having 1 to 6 carbon atoms, a hydrogen atom, a halogen atom, a hydroxy group, an alkoxy group having 1 to 6 carbon atoms, or an aryl group having 6 to 14 carbon atoms, $Q^2$ represents a divalent aliphatic group having 1 to 10 carbon atoms, and "n" represents an average chain length and is as described above.

In the general formula (II-V), examples of the alkyl group having 1 to 13 carbon atoms that $R^{18}$ to $R^{21}$ each independently represent include a methyl group, an ethyl group, a n-propyl group, an isopropyl group, various butyl groups, various pentyl groups, various hexyl groups, various heptyl groups, various octyl groups, a 2-ethylhexyl group, various nonyl groups, various decyl groups, various undecyl groups, various dodecyl groups, and various tridecyl groups. Among them, $R^{18}$ to $R^{21}$ each preferably represent a hydrogen atom or an alkyl group having 1 to 6 carbon atoms, and it is more preferred that all of $R^{18}$ to $R^{21}$ each represent a methyl group.

Examples of the alkyl group having 1 to 6 carbon atoms represented by $R^{22}$ include a methyl group, an ethyl group, a n-propyl group, an isopropyl group, various butyl groups, various pentyl groups, and various hexyl groups. Examples of the halogen atom represented by $R^{22}$ include a fluorine atom, a chlorine atom, a bromine atom, and an iodine atom. An example of the alkoxy group having 1 to 6 carbon atoms represented by $R^{22}$ is an alkoxy group whose alkyl group moiety is the alkyl group described above. Examples of the aryl group having 6 to 14 carbon atoms represented by $R^{22}$ include a phenyl group, a tolyl group, a dimethylphenyl group, and a naphthyl group.

Among them, $R^{22}$ preferably represents a hydrogen atom or an alkoxy group having 1 to 6 carbon atoms, more preferably represents a hydrogen atom or an alkoxy group having 1 to 3 carbon atoms, and still more preferably represents a hydrogen atom.

The divalent aliphatic group having 1 to 10 carbon atoms represented by $Q^2$ is preferably a linear or branched divalent saturated aliphatic group having 1 or more to 10 or less carbon atoms. The number of carbon atoms of the saturated aliphatic group is preferably from 1 or more to 8 or less, more preferably from 2 or more to 6 or less, still more preferably from 3 or more to 6 or less, still further more preferably from 4 or more to 6 or less. The average chain length "n" is as described above.

A preferred mode of the constituent unit (II-V) may be, for example, a structure represented by the following general formula (II-VI):

may be obtained by: causing cyclotrisiloxane and disiloxane to react with each other in the presence of an acid catalyst to synthesize α,ω-dihydrogen organopentasiloxane; and then subjecting the α,ω-dihydrogen organopentasiloxane to an addition reaction with, for example, a phenolic compound (e.g., 2-allylphenol, 4-allylphenol, eugenol, or 2-propenylphenol) in the presence of a catalyst for a hydrosilylation reaction. According to a method described in JP 2662310B2, the crude polyorganosiloxane may be obtained by: causing octamethylcyclotetrasiloxane and tetramethyldisiloxane to react with each other in the presence of sulfuric acid (acid catalyst); and subjecting the resultant α,ω-dihydrogen organopolysiloxane to an addition reaction with the phenolic compound or the like in the presence of the catalyst for a hydrosilylation reaction in the same manner as that described above. The α,ω-dihydrogen organopolysiloxane may be used after its chain length "n" has been appropriately adjusted in accordance with its polymerization conditions, or a commercial α,ω-dihydrogen organopolysiloxane may be used. Specifically, an α,ω-dihydrogen organopolysiloxane described in JP 2016-098292 A may be used.

The polycarbonate oligomer may be produced by a reaction between a dihydric phenol and a carbonate precursor, such as phosgene or triphosgene, in an organic solvent, such as methylene chloride, chlorobenzene, or chloroform. When the polycarbonate oligomer is produced by using an ester exchange method, the oligomer may be produced by a

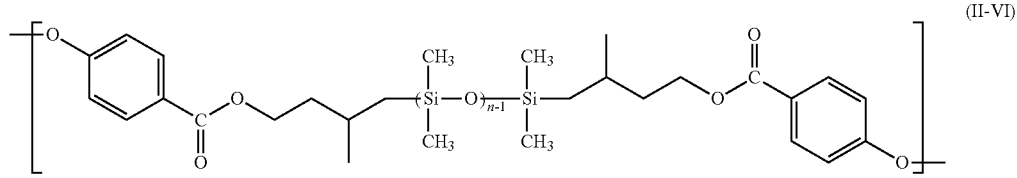

(II-VI)

wherein "n" is as described above.

The polyorganosiloxane block (A-2) represented by the general formula (II-V) or (II-VI) may be obtained by using a polyorganosiloxane raw material represented by the following general formula (5) or (6):

reaction between the dihydric phenol and a carbonate precursor, such as diphenyl carbonate.

A dihydric phenol represented by the following general formula (viii) is preferably used as the dihydric phenol:

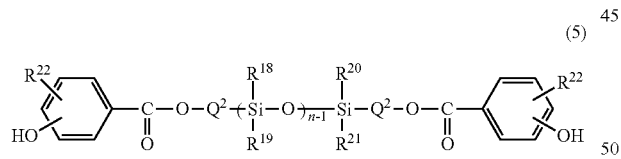

(5)

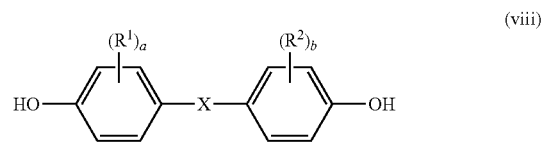

(viii)

wherein $R^{18}$ to $R^{22}$, $Q^2$, and "n" are as described above;

wherein $R^1$, $R^2$, "a", "b", and X are as described above.

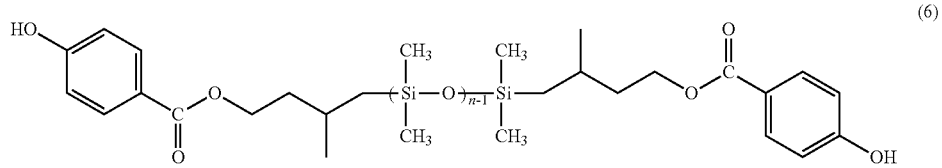

(6)

wherein "n" is as described above.

A method of producing the polyorganosiloxane is not particularly limited. According to, for example, a method described in JP 11-217390 A, a crude polyorganosiloxane Examples of the dihydric phenol represented by the general formula (viii) include: bis(hydroxyphenyl)alkane-based dihydric phenols, such as 2,2-bis(4-hydroxyphenyl) propane [bisphenol A], bis(4-hydroxyphenyl)methane, 1,1- bis(4-hydroxyphenyl)ethane, and 2,2-bis(4-hydroxy-3,5-dimethylphenyl)propane; 4,4'-dihydroxydiphenyl; bis(4-hydroxyphenyl)cycloalkanes; bis(4-hydroxyphenyl) oxide; bis(4-hydroxyphenyl) sulfide; bis(4-hydroxyphenyl) sulfone; bis(4-hydroxyphenyl) sulfoxide; and bis(4-hydroxyphenyl) ketone. Those dihydric phenols may be used alone or as a mixture thereof.

Among them, bis(hydroxyphenyl)alkane-based dihydric phenols are preferred, and bisphenol A is more preferred. When bisphenol A is used as the dihydric phenol, the PC-POS copolymer is such that in the general formula (I), X represents an isopropylidene group and a=b=0.

Examples of the dihydric phenol except bisphenol A include bis(hydroxyaryl)alkanes, bis(hydroxyaryl)cycloalkanes, dihydroxyaryl ethers, dihydroxydiaryl sulfides, dihydroxydiaryl sulfoxides, dihydroxydiaryl sulfones, dihydroxydiphenyls, dihydroxydiarylfluorenes, and dihydroxydiaryladamantanes. Those dihydric phenols may be used alone or as a mixture thereof.

Examples of the bis(hydroxyaryl)alkanes include bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-3-tert-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl)propane.

Examples of the bis(hydroxyaryl)cycloalkanes include 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane. Examples of the dihydroxyaryl ethers include 4,4'-dihydroxydiphenyl ether and 4,4'-dihydroxy-3,3'-dimethylphenyl ether.

Examples of the dihydroxydiaryl sulfides include 4,4'-dihydroxydiphenyl sulfide and 4,4'-dihydroxy-3,3'-dimethyldiphenyl sulfide. Examples of the dihydroxydiaryl sulfoxides include 4,4'-dihydroxydiphenyl sulfoxide and 4,4'-dihydroxy-3,3'-dimethyldiphenyl sulfoxide. Examples of the dihydroxydiaryl sulfones include 4,4'-dihydroxydiphenyl sulfone and 4,4'-dihydroxy-3,3'-dimethyldiphenyl sulfone.

An example of the dihydroxydiphenyls is 4,4'-dihydroxydiphenyl. Examples of the dihydroxydiarylfluorenes include 9,9-bis(4-hydroxyphenyl)fluorene and 9,9-bis(4-hydroxy-3-methylphenyl)fluorene. Examples of the dihydroxydiaryladamantanes include 1,3-bis(4-hydroxyphenyl)adamantane, 2,2-bis(4-hydroxyphenyl)adamantane, and 1,3-bis(4-hydroxyphenyl)-5,7-dimethyladamantane.

Examples of dihydric phenols except those described above include 4,4'-[1,3-phenylenebis(1-methylethylidene)]bisphenol, 10,10-bis(4-hydroxyphenyl)-9-anthrone, and 1,5-bis(4-hydroxyphenylthio)-2,3-dioxapentane.

In order to adjust the molecular weight of the PC-POS copolymer to be obtained, a terminal stopper (molecular weight modifier) may be used. Examples of the terminal stopper may include monohydric phenols, such as phenol, p-cresol, p-tert-butylphenol, p-tert-octylphenol, p-cumylphenol, p-nonylphenol, m-pentadecylphenol, and p-tert-amylphenol. Those monohydric phenols may be used alone or in combination thereof.

After the interfacial polycondensation reaction, the PC-POS copolymer (A) may be obtained by appropriately leaving the resultant at rest to separate the resultant into an aqueous phase and an organic solvent phase [separating step], washing the organic solvent phase (preferably washing the phase with a basic aqueous solution, an acidic aqueous solution, and water in the stated order) [washing step], concentrating the resultant organic phase [concentrating step], and drying the concentrated phase [drying step].

<Aromatic Polycarbonate-Based Resin (B)>

An aromatic polycarbonate-based resin (B) is a polycarbonate-based resin except the PC-POS copolymer (A), and preferably includes, in a main chain thereof, a repeating unit represented by the following general formula (III). The polycarbonate-based resin is not particularly limited, and various known polycarbonate-based resins may each be used.

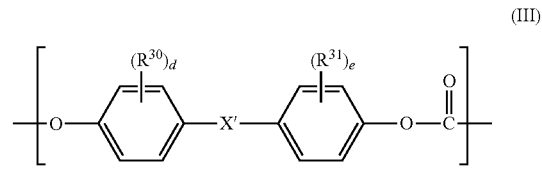

(III)

wherein $R^{30}$ and $R^{31}$ each independently represent a halogen atom, an alkyl group having 1 to 6 carbon atoms, or an alkoxy group having 1 to 6 carbon atoms, X' represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and "d" and "e" each independently represent an integer of from 0 to 4.

Specific examples of the group represented by each of $R^{30}$ and $R^{31}$ include the same examples as those of $R^1$ and $R^2$, and preferred examples thereof are also the same as those of $R^1$ and $R^2$. $R^{30}$ and $R^{31}$ each more preferably represent an alkyl group having 1 to 6 carbon atoms or an alkoxy group having 1 to 6 carbon atoms. Specific examples of X' include the same examples as those of X, and preferred examples thereof are also the same as those of X. "d" and "e" each independently represent preferably from 0 to 2, more preferably 0 or 1.

Specifically, a resin obtained by a conventional production method for a polycarbonate resin may be used as the aromatic polycarbonate-based resin (B). Examples of the conventional method include: an interfacial polymerization method involving causing the dihydric phenol-based compound and phosgene to react with each other in the presence of an organic solvent inert to the reaction and an aqueous alkali solution, adding a polymerization catalyst, such as a tertiary amine or a quaternary ammonium salt, to the resultant, and polymerizing the mixture; and a pyridine method involving dissolving the dihydric phenol-based compound in pyridine or a mixed solution of pyridine and an inert solvent, and introducing phosgene to the solution to directly produce the resin.

A molecular weight modifier (terminal stopper), a branching agent, or the like is used as required in the reaction.

The dihydric phenol-based compound is, for example, a compound represented by the following general formula (III'):

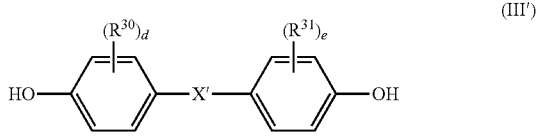

wherein $R^{30}$, $R^{31}$, X', "d", and "e" are as defined above, and preferred examples thereof are also the same as those described above.

Specific examples of the dihydric phenol-based compound may include those described above in the method of producing the polycarbonate-polyorganosiloxane copolymer (A), and preferred examples thereof are also the same as those described above. Among them, bis(hydroxyphenyl) alkane-based dihydric phenols are preferred, and bisphenol A is more preferred.

The aromatic polycarbonate-based resins (B) may be used alone or in combination thereof. The aromatic polycarbonate-based resin (B) may have a structure free of such a polyorganosiloxane block as represented by the formula (II) unlike the polycarbonate-polyorganosiloxane copolymer (A). For example, the aromatic polycarbonate-based resin (B) may be a homopolycarbonate-based resin.

<Polyester-Based Resin (C)>

A polyester-based resin (C) to be incorporated into the polycarbonate-based resin composition of the present invention may be, for example, a polymer or copolymer obtained by a condensation reaction involving using an aromatic dicarboxylic acid or a reactive derivative thereof and a diol or an ester derivative thereof as main components.

Examples of the aromatic dicarboxylic acid include terephthalic acid, isophthalic acid, o-phthalic acid, 1,5-naphthalenedicarboxylic acid, 2,6-naphthalenedicarboxylic acid, 4,4'-biphenyldicarboxylic acid, 4,4'-biphenyl ether dicarboxylic acid, 4,4'-biphenylmethane dicarboxylic acid, 4,4'-biphenyl sulfone dicarboxylic acid, 4,4'-biphenylisopropylidene dicarboxylic acid, 1,2-bis(phenoxy)ethane-4,4'-dicarboxylic acid, 2,5-anthracenedicarboxylic acid, 2,6-anthracenedicarboxylic acid, 4,4'-p-terphenylenedicarboxylic acid, and 2,5-pyridinedicarboxylic acid. Substituted products (e.g., alkyl group-substituted products, such as 5-methylisophthalic acid) and reactive derivatives (e.g., alkyl ester derivatives, such as dimethyl terephthalate and diethyl terephthalate) thereof may also be used.

Among them, terephthalic acid and 2,6-naphthalenedicarboxylic acid, and alkyl ester derivatives thereof are more preferred, and terephthalic acid and alkyl ester derivatives thereof are particularly preferred. Those aromatic dicarboxylic acids may be used alone or in combination thereof. One or more of, for example, aliphatic dicarboxylic acids, such as adipic acid, azelaic acid, sebacic acid, and dodecanedioic acid, and alicyclic dicarboxylic acids, such as cyclohexane dicarboxylic acid, may also be used in combination with the aromatic dicarboxylic acid.

Examples of the diols each serving as a component of the polyester-based resin (C) may include: aliphatic diols, such as ethylene glycol, diethylene glycol, 1,2-propylene glycol, 1,3-propanediol, triethylene glycol, 1,4-butanediol, neopentyl glycol, 1,5-pentanediol, 1,6-hexanediol, decamethylene glycol, and 2,2-dimethyl-1,3-propanediol; alicyclic diols, such as 1,4-cyclohexanedimethanol, 1,3-cyclohexanedimethanol, cyclohexanediol, and trans- or cis-2,2,4,4-tetramethyl-1,3-cyclobutanediol; and aromatic diols, such as p-xylenediol, bisphenol A, tetrabromobisphenol A, and tetrabromobisphenol A-bis(2-hydroxyethyl ether). Substituted products thereof may also be used.

Among them, in terms of heat resistance, dimensional stability, and the like, an aliphatic diol is preferred, ethylene glycol, 1,4-butanediol, or 1,4-cyclohexanedimethanol is more preferred, and ethylene glycol is particularly preferred. The diols may be used alone or in combination thereof. One or more of long-chain diols each having a molecular weight of from 400 or more to 6,000 or less, that is, for example, a polyethylene glycol, a poly-1,3-propylene glycol, and a polytetramethylene glycol may be used as diol components in combination with the above-mentioned diols and copolymerized therewith.

The polyester-based resin (C) may be copolymerized with a hydroxycarboxylic acid, such as parahydroxybenzoic acid, any other carboxylic acid, or an alcohol except the above-mentioned diols, and such copolymerized resin may also be used in the present invention. However, the amount of such copolymerized component is preferably as small as possible, and components derived from the aromatic dicarboxylic acid and the aliphatic diol account for preferably 80 mass % or more, more preferably 90 mass % or more of the polyester-based resin (C). One kind of compound accounts for preferably 80 mol % or more, more preferably 90 mol % or more of each of the aromatic dicarboxylic acid and the aliphatic diol.

The polyester-based resin (C) may be branched by introducing a small amount of a branching agent. Although the kind of the branching agent is not limited, examples thereof include trimesic acid, trimellitic acid, trimethylolethane, trimethylolpropane, and pentaerythritol.

Specific examples of the polyester-based resin (C) include: a polyethylene terephthalate (PET), a polypropylene terephthalate, a polybutylene terephthalate (PBT), a polyhexylene terephthalate, a polyethylene naphthalate (PEN), a polybutylene naphthalate (PBN), and a polyethylene-1,2-bis(phenoxy)ethane-4,4'-dicarboxylate; and copolymerized polyester-based resins, such as a polyethylene isophthalate/terephthalate and a polybutylene terephthalate/isophthalate. Among them, a polyethylene terephthalate, a polybutylene terephthalate, a polyethylene naphthalate, and a polybutylene naphthalate, and mixtures thereof having balanced mechanical properties and the like may be preferably used. The polyester-based resin (C) is more preferably at least one selected from a polyethylene terephthalate and a polybutylene terephthalate from the viewpoint of the ease of availability of a material therefor, and is still more preferably a polyethylene terephthalate from the view point of its transparency. The compounds preferably have a ratio "PET:PBT" of from 1:1 to 1:8 (mass ratio) when used in combination.

<Other Components>

Any other additive may be incorporated into the polycarbonate-based resin composition of the present invention to the extent that the effects of the present invention are not impaired.

Examples of the other additive may include an antioxidant, a UV absorber, a release agent, a reinforcing material, a filler, an elastomer for an impact resistance improvement, a dye, a pigment, an antistatic agent, and resins except the polycarbonate-based resin.

<Polycarbonate-Based Resin Composition>

The polycarbonate-based resin composition of the present invention includes: 50 mass % or more to 99 mass % or less of a polycarbonate-based resin (S) containing 0.1 mass % or more to 100 mass % or less of the polycarbonate-polyorganosiloxane copolymer (A), and 0 mass % or more to 99.9 mass % or less of the aromatic polycarbonate-based resin (B) except the polycarbonate-polyorganosiloxane copolymer (A); and 1 mass % or more to 50 mass % or less of the polyester-based resin (C).

In the polycarbonate-based resin composition, the content of the polycarbonate-polyorganosiloxane copolymer (A) in the polycarbonate-based resin (S) needs to be from 0.1 mass % or more to 100 mass % or less from the viewpoint of obtaining a resin composition having desired properties, such as impact resistance, transparency, and chemical resistance, and is typically 5 mass % or more, preferably 10 mass % or more, more preferably 20 mass % or more, still more preferably 30 mass % or more, and is preferably 99 mass % or less, more preferably 95 mass % or less.

Meanwhile, the content of the aromatic polycarbonate-based resin (B) in the polycarbonate-based resin (S) needs to be from 0 mass % or more to 99.9 mass % or less from the viewpoint of the impact resistance of the resin composition to be obtained, and is preferably 1 mass % or more, and is typically 95 mass % or less, preferably 90 mass % or less, more preferably 80 mass % or less, still more preferably 70 mass % or less.

The content of the polyorganosiloxane block (A-2) in the polycarbonate-based resin (S) is preferably from 0.1 mass % or more to 10 mass % or less. When the content of the polyorganosiloxane block (A-2) in the polycarbonate-based resin (S) falls within the range, an excellent impact-resisting characteristic can be obtained.

The content of the polyorganosiloxane block (A-2) in the polycarbonate-based resin (S) is more preferably 0.4 mass % or more, still more preferably 0.8 mass % or more, still further more preferably 1 mass % or more, particularly preferably 3 mass % or more, and is more preferably 8 mass % or less, still more preferably 7 mass % or less, particularly preferably 6 mass % or less.

The polyester-based resin (C) is incorporated at from 1 mass % or more to 50 mass % or less into the polycarbonate-based resin composition of the present invention. The content of the polyester-based resin (C) in the polycarbonate-based resin composition is preferably 3 mass % or more, more preferably 5 mass % or more, still more preferably 10 mass % or more, particularly preferably 15 mass % or more, most preferably 20 mass % or more, and is preferably 45 mass % or less, more preferably 35 mass % or less, still more preferably 30 mass % or less, particularly preferably 25 mass % or less.

The viscosity-average molecular weight (Mv) of the polycarbonate-based resin (S) containing the PC-POS copolymer (A) and the aromatic polycarbonate-based resin (B) may be appropriately adjusted by using, for example, a molecular weight modifier (terminal stopper) so as to be a target molecular weight in accordance with applications or products in which the resin (S) is used. The viscosity-average molecular weight of the polycarbonate-based resin (S) is preferably from 9,000 or more to 50,000 or less. When the viscosity-average molecular weight is 9,000 or more, a sufficient strength of a molded article can be obtained. When the viscosity-average molecular weight is 50,000 or less, injection molding or extrusion molding can be performed at the temperature at which the heat deterioration of the resin (S) does not occur.

The viscosity-average molecular weight of the polycarbonate-based resin (S) is more preferably 12,000 or more, still more preferably 14,000 or more, particularly preferably 16,000 or more, and is more preferably 30,000 or less, still more preferably 23,000 or less, particularly preferably 21,000 or less.

The viscosity-average molecular weight (Mv) is a value calculated from the following Schnell's equation by measuring the limiting viscosity [η] of a methylene chloride solution at 20° C.

$$[\eta]=1.23\times10^{-5}\times Mv^{0.83}$$

The polycarbonate-based resin composition of the present invention is obtained by: blending the above-mentioned respective components at the above-mentioned ratios and various optional components to be used as required at appropriate ratios; and kneading the components.

In one aspect of the present invention, the total content of the component (A), the component (B), and the component (C) is preferably from 80 mass % to 100 mass %, more preferably from 95 mass % to 100 mass %, still more preferably from 97 mass % to 100 mass %, particularly preferably from 98 mass % to 100 mass %, most preferably from 99 mass % to 100 mass % with respect to the total amount (100 mass %) of the polycarbonate-based resin composition.

In another aspect of the present invention, the total content of the component (A), the component (B), the component (C), and the other components is preferably from 90 mass % to 100 mass %, more preferably from 95 mass % to 100 mass %, still more preferably from 97 mass % to 100 mass %, particularly preferably from 98 mass % to 100 mass %, most preferably from 99 mass % to 100 mass % with respect to the total amount (100 mass %) of the polycarbonate-based resin composition.

The blending and the kneading may be performed by a method involving premixing with a typically used apparatus, such as a ribbon blender or a drum tumbler, and using, for example, a Henschel mixer, a Banbury mixer, a single-screw extruder, a twin-screw extruder, a multi-screw extruder, or a Ko-kneader. In normal cases, a heating temperature at the time of the kneading is appropriately selected from the range of from 240° C. or more to 320° C. or less. An extruder, in particular a vented extruder is preferably used in the melt-kneading.

The polycarbonate-based resin composition of the present invention is characterized in that the composition has excellent chemical resistance and excellent impact resistance, and is excellent in transparency. Specifically, a total light transmittance when the polycarbonate-based resin composition of the present invention is turned into a 3-millimeter thick plate needs to be 80% or more. The total light transmittance is a value measured in conformity with ISO 14782:1999. The total light transmittance is preferably 83% or more, more preferably 85% or more, particularly preferably 87% or more.

The polycarbonate-based resin composition of the present invention is preferably free of a fluorine-containing flame retardant aid and/or an inorganic filler. When the composition is free of a fluorine-containing flame retardant aid or an inorganic filler, a higher total light transmittance can be obtained.

[Molded Article]

Various molded bodies may each be produced by an injection molding method, an injection compression molding method, an extrusion molding method, a blow molding method, a press molding method, a vacuum molding method, an expansion molding method, or the like using as a raw material the melt-kneaded polycarbonate-based resin composition of the present invention or a pellet obtained through the melt-kneading. In particular, the pellet obtained through the melt-kneading can be suitably used in the production of injection-molded bodies by injection molding and injection compression molding.

The molded article formed of the polycarbonate-based resin composition of the present invention can be suitably used in, for example, exterior and internal parts for parts for electrical and electronic equipment, such as a television, a radio, a camera, a video camera, an audio player, a DVD player, an air conditioner, a cellular phone, a smartphone, a transceiver, a display, a computer, a tablet terminal, portable game equipment, stationary game equipment, wearable electronic equipment, a register, an electronic calculator, a copying machine, a printer, a facsimile, a communication base station, a battery, or a robot, exterior and internal parts for an automobile, a railway vehicle, a ship, an aircraft, equipment for space industry, or medical equipment, and a part for a building material.

EXAMPLES

The present invention is more specifically described by way of Examples. However, the present invention is by no means limited by these Examples. In each of Examples, characteristic values and evaluation results were determined in the following manner.
(1) Chain Length and Content of Polydimethylsiloxane The chain length and content of a polydimethylsiloxane were calculated by NMR measurement from the integrated value ratio of a methyl group of the polydimethylsiloxane. In this description, the polydimethylsiloxane is sometimes abbreviated as PDMS.

<Quantification Method for Chain Length of Polydimethylsiloxane>

$^1$H-NMR Measurement Conditions

NMR apparatus: ECA-500 manufactured by JEOL Resonance Co., Ltd.
  Probe: 50TH5AT/FG2
  Observed range: −5 ppm to 15 ppm
  Observation center: 5 ppm
  Pulse repetition time: 9 sec
  Pulse width: 45°
  NMR sample tube: 5 φ
  Sample amount: 30 mg to 40 mg
  Solvent: deuterochloroform
  Measurement temperature: room temperature
  Number of scans: 256 times
Allylphenol-terminated Polydimethylsiloxane
  A: an integrated value of a methyl group in a dimethylsiloxane moiety observed around δ −0.02 to δ 0.5
  B: an integrated value of a methylene group in allylphenol observed around δ 2.50 to δ 2.75

Chain length of polydimethylsiloxane=(A/6)/(B/4)

Eugenol-Terminated Polydimethylsiloxane
  A: an integrated value of a methyl group in a dimethylsiloxane moiety observed around δ −0.02 to δ 0.5
  B: an integrated value of a methylene group in eugenol observed around δ 2.40 to δ 2.70

Chain length of polydimethylsiloxane=(A/6)/(B/4)

<Quantification Method for Content of Polydimethylsiloxane>

Quantification method for the copolymerization amount of a polydimethylsiloxane in a PTBP-terminated polycarbonate resin obtained by copolymerizing an allylphenol-terminated polydimethylsiloxane.

NMR apparatus: ECA-500 manufactured by JEOL Resonance Co., Ltd.
  Probe: 50TH5AT/FG2
  Observed range: −5 ppm to 15 ppm
  Observation center: 5 ppm
  Pulse repetition time: 9 sec
  Pulse width: 45°
  Number of scans: 256 times
  NMR sample tube: 5 φ
  Sample amount: 30 mg to 40 mg
  Solvent: deuterochloroform
  Measurement temperature: room temperature
  A: an integrated value of a methyl group in a BPA moiety observed around δ 1.5 to δ 1.9
  B: an integrated value of a methyl group in a dimethylsiloxane moiety observed around δ −0.02 to δ 0.3
  C: an integrated value of a butyl group in a p-tert-butylphenyl moiety observed around δ 1.2 to δ 1.4

$a=A/6$ $b=B/6$ $c=C/9$ $T=a+b+c$ $f=a/T\times100$ $g=b/T\times100$ $h=c/T\times100$ $TW=f\times254+g\times74.1+h\times149$ PDMS (wt %)$=g\times74.1/TW\times100$ (2) Viscosity-Average Molecular Weight A viscosity-average molecular weight (Mv) was calculated from the following equation (Schnell's equation) by using a limiting viscosity [η] determined through the measurement of the viscosity of a methylene chloride solution at 20° C. with an Ubbelohde-type viscometer.

$[\eta]=1.23\times10^{-5}\times Mv^{0.83}$

Production Example 1: Production of Polycarbonate Oligomer

Sodium dithionite was added in an amount of 2,000 ppm with respect to bisphenol A (BPA) (to be dissolved later) to 5.6 mass % aqueous sodium hydroxide, and then BPA was dissolved in the mixture so that the concentration of BPA was 13.5 mass %. Thus, a solution of BPA in aqueous sodium hydroxide was prepared.

The solution of BPA in aqueous sodium hydroxide, methylene chloride, and phosgene were continuously passed through a tubular reactor having an inner diameter of 6 mm and a tube length of 30 m at flow rates of 40 L/hr, 15 L/hr, and 4.0 kg/hr, respectively. The tubular reactor had a jacket portion and the temperature of the reaction liquid was kept at 40° C. or less by passing cooling water through the jacket. The reaction liquid that had exited the tubular reactor was continuously introduced into a baffled vessel type reactor provided with a sweptback blade and having an internal volume of 40 L. The solution of BPA in aqueous sodium hydroxide, 25 mass % aqueous sodium hydroxide, water, and a 1 mass % aqueous solution of triethylamine were further added to the reactor at flow rates of 2.8 L/hr, 0.07 L/hr, 17 L/hr, and 0.64 L/hr, respectively, to perform a reaction. An aqueous phase was separated and removed by continuously taking out the reaction liquid overflowing the vessel type reactor and leaving the reaction liquid at rest. Then, a methylene chloride phase was collected.

The polycarbonate oligomer thus obtained had a concentration of 341 g/L and a chloroformate group concentration of 0.71 mol/L.

<Polycarbonate-Polyorganosiloxane Copolymer (A1)>

15 L of the polycarbonate oligomer solution produced in Production Example 1 described above, 10.1 L of methylene chloride, 407 g of an o-allylphenol terminal-modified polydimethylsiloxane (PDMS) in which the average chain length "n" of a polydimethylsiloxane was 37, and 8.4 mL of triethylamine were loaded into a 50-liter vessel-type reactor including a baffle board, a paddle-type stirring blade, and a cooling jacket. 1,065 g of aqueous sodium hydroxide prepared by dissolving 85 g of sodium hydroxide in 980 mL of pure water was added to the mixture under stirring to perform a reaction between the polycarbonate oligomer and the o-allylphenol terminal-modified PDMS for 20 minutes.

A solution of p-tert-butylphenol (PTBP) in methylene chloride (prepared by dissolving 70.4 g of PTBP in 1.0 L of methylene chloride) and a solution of bisphenol A in aqueous sodium hydroxide (prepared by dissolving 1,093 g of bisphenol A in an aqueous solution prepared by dissolving 618 g of sodium hydroxide and 2.1 g of sodium dithionite in 9.0 L of pure water) were added to the polymerization liquid to perform a polymerization reaction for 40 minutes.

13 L of methylene chloride was added to the resultant for dilution and the mixture was stirred for 20 minutes. After that, the mixture was separated into an organic phase containing a polycarbonate-polydimethylsiloxane copolymer (PC-PDMS copolymer), and an aqueous phase containing excess amounts of bisphenol A and sodium hydroxide, and the organic phase was isolated.

The solution of the PC-PDMS copolymer in methylene chloride thus obtained was sequentially washed with 0.03 mol/L aqueous sodium hydroxide and 0.2 mol/L hydrochloric acid in amounts of 15 vol % each with respect to the solution. Next, the solution was repeatedly washed with pure water until an electric conductivity in an aqueous phase after the washing became 5 µS/cm or less.

The solution of the PC-PDMS copolymer in methylene chloride obtained by the washing was concentrated and pulverized, and the resultant flake was dried under reduced pressure at 120° C. Thus, a PC-PDMS copolymer (A1) was produced.

The resultant PC-PDMS copolymer (A1) had a PDMS block moiety content determined by NMR of 6.0 mass % and a viscosity-average molecular weight Mv of 17,700.

<Polycarbonate-Polyorganosiloxane Copolymer (A2)>

A PC-PDMS copolymer (A2) was produced in the same manner as in the polycarbonate-polyorganosiloxane copolymer (A1) except that an o-allylphenol terminal-modified PDMS in which the average chain length "n" of a polydimethylsiloxane was 88 was used.

The resultant PC-PDMS copolymer (A2) had a PDMS block moiety content determined by nuclear magnetic resonance (NMR) of 6.0 mass % and a viscosity-average molecular weight Mv of 17,700.

<Aromatic Polycarbonate-Based Resin (B)>

Aromatic homopolycarbonate resin (B1) [manufactured by Idemitsu Kosan Co., Ltd., TARFLON FN2500 (product name), viscosity-average molecular weight=23,500]

Aromatic homopolycarbonate resin (B2) [manufactured by Idemitsu Kosan Co., Ltd., TARFLON FN2200 (product name), viscosity-average molecular weight=21,300]

Aromatic homopolycarbonate resin (B3) [manufactured by Idemitsu Kosan Co., Ltd., TARFLON FN1900 (product name), viscosity-average molecular weight=19,300]

Aromatic homopolycarbonate resin (B4) [manufactured by Idemitsu Kosan Co., Ltd., TARFLON FN1700 (product name), viscosity-average molecular weight=17,700]

<Polyester-Based Resin (C)>

Polyethylene terephthalate (C1): "MITSUI PET J055" [manufactured by Mitsui Chemicals, Inc.]

Polyethylene terephthalate (C2): "MITSUI PET J125" [manufactured by Mitsui Chemicals, Inc.]

Polyethylene terephthalate (C3): "KURAPET KS760K-12" [manufactured by Kuraray Co., Ltd.]

Polybutylene terephthalate (C4): "DURANEX 2002 EF2001" [manufactured by WinTech Polymer Ltd.]

<Other Components>

Antioxidant: "IRGAFOS 168 (product name)" [tris(2,4-di-tert-butylphenyl) phosphite, manufactured by BASF Japan]

Antioxidant: "IRGANOX 1076 (product name)" [octadecyl 3-(3,5-di-tert-butyl-4-hydroxyphenyl)propionate, manufactured by BASF Japan]

Examples 1 to 11, Comparative Examples 1-1 to 10-2, and Reference Examples 1 and 2

The PC-POS copolymers (A1) and (A2), and the other respective components were mixed at blending ratios shown in Table 1 to Table 3. Each of the mixtures was supplied to a vented twin-screw extruder (manufactured by Toshiba Machine Co., Ltd., TEM-35B), and was melt-kneaded at a screw revolution number of 150 rpm, an ejection amount of 20 kg/hr, and a resin temperature of from 295° C. to 300° C. to provide an evaluation pellet sample. The evaluation pellet sample was dried at 100° C. for 8 hours, and was then subjected to injection molding with an injection molding machine (manufactured by Nissei Plastic Industrial Co., Ltd., NEX110, screw diameter: 36 mmφ) at a cylinder temperature of 280° C. and a die temperature of 80° C. to produce test pieces for performing an Izod test (2 test pieces each measuring 63 mm by 13 mm by 3.2 mm) and a HDT test piece (measuring 126 mm by 13 mm by 3.2 mm). Further, the dried evaluation pellet sample was subjected to injection molding with an injection molding machine (manufactured by Niigata Machine Techno Co., Ltd., MD50XB, screw diameter: 30 mmφ) to produce a test piece for performing total light transmittance measurement (three-stage plate measuring 90 mm by 50 mm, the plate including a 3-millimeter thick portion measuring 45 mm by 50 mm, a 2-millimeter thick portion measuring 22.5 mm by 50 mm, and a 1-millimeter thick portion measuring 22.5 mm by 50 mm).

TABLE 1-1

| | | | | Example 1 | Comparative Example 1-1 | Comparative Example 1-2 | Example 2 | Comparative Example 2-1 | Comparative Example 2-2 |
|---|---|---|---|---|---|---|---|---|---|
| Molecular weight of resin (A) + resin (B) | | | | 18,900 | 18,900 | 18,900 | 18,900 | 18,900 | 18,900 |
| PC-POS copolymer (A) | (A1) n = 37 | | Parts by mass | 76 | | | 68 | | |
| | (A2) n = 88 | | Parts by mass | | 76 | | | | 68 |
| Aromatic PC resin (B) | (B1) FN2500 | | Parts by mass | 19 | | | 19 | 17 | 17 |
| | (B2) FN2200 | | Parts by mass | | | | | | |
| | (B3) FN1900 | | Parts by mass | | 70 | | | 62 | |
| | (B4) FN1700 | | Parts by mass | | | 25 | | | 23 |

TABLE 1-1-continued

|  |  |  | Example 1 | Comparative Example 1-1 | Comparative Example 1-2 | Example 2 | Comparative Example 2-1 | Comparative Example 2-2 |
|---|---|---|---|---|---|---|---|---|
| Polyester-based resin (C) | (C1) J055 (PET) | Parts by mass | 5 | 5 | 5 | 15 | 15 | 15 |
|  | (C2) J125 (PET) | Parts by mass |  |  |  |  |  |  |
|  | (C3) KS760K-12 (PET) | Parts by mass |  |  |  |  |  |  |
|  | (C4) 2002 (PBT) | Parts by mass |  |  |  |  |  |  |
| Antioxidant | Irgafos 168 | Parts by mass | 0.10 | 0.10 | 0.10 | 0.10 | 0.10 | 0.10 |
|  | Irganox 1076 | Parts by mass | 0.10 | 0.10 | 0.10 | 0.10 | 0.10 | 0.10 |
| Content of PDMS block moiety in resins (A) + (B) |  | mass % | 4.8 | 0.0 | 4.8 | 4.8 | 0.0 | 4.8 |
| Evaluation | Optical characteristic | Tt % | 88 | 87 | 74 | 87 | 78 | 73 |
|  |  | Haze % | 1.4 | 38 | 10 | 2.5 | 56 | 12 |
|  |  | YI | 8.3 | — | — | 13 | — | — |
|  | Physical property | MFR (300° C., 1.2 kg) g/10 min | 11 | 20 | 12 | 11 | 18 | 13 |
|  |  | Q value (280° C., 160 kg) × 0.01 mL/s | 9 | 10 | 10 | 9 | 9 | 11 |
|  |  | Izod impact strength (23° C.) kJ/m² | 85 | — | — | 84 | — | — |
|  |  | Izod impact strength (0° C.) kJ/m² | — | — | — | — | — | — |
|  |  | Izod impact strength (−10° C.) kJ/m² | — | — | — | — | — | — |
|  |  | Izod impact strength (−20° C.) kJ/m² | — | — | — | 66 | — | — |
|  |  | Izod impact strength (−30° C.) kJ/m² | 61 | — | — | 20 | — | — |
|  |  | Izod impact strength (−40° C.) kJ/m² | 24 | — | — | 16 | — | — |
|  |  | HDT (1.83 MPa) ° C. | 121 | 128 | 124 | 119 | 126 | 121 |
|  | Chemical resistance | 2 minutes after application of isobutyl acetate under strain of 1% | A | B | A | A | B | A |

TABLE 1-2

|  |  |  | Example 3 | Comparative Example 3-1 | Comparative Example 3-2 | Example 3-1 | Example 3-2 | Example 3-3 | Example 3-4 |
|---|---|---|---|---|---|---|---|---|---|
| Molecular weight of resin (A) + resin (B) |  |  | 18,400 | 18,400 | 18,400 | 18,400 | 18,400 | 18,400 | 18,400 |
| PC-POS copolymer (A) | (A1) n = 37 | Parts by mass | 64 |  |  | 32 | 40 | 48 | 56 |
|  | (A2) n = 88 | Parts by mass |  |  | 64 |  |  |  |  |
| Aromatic PC resin (B) | (B1) FN2500 | Parts by mass |  |  |  |  |  |  |  |
|  | (B2) FN2200 | Parts by mass | 16 | 16 | 16 | 16 | 16 | 16 | 16 |
|  | (B3) FN1900 | Parts by mass |  |  |  |  |  |  |  |
|  | (B4) FN1700 | Parts by mass |  | 64 |  | 32 | 24 | 16 | 8 |
| Polyester-based resin (C) | (C1) J055 (PET) | Parts by mass | 20 | 20 | 20 | 20 | 20 | 20 | 20 |
|  | (C2) J125 (PET) | Parts by mass |  |  |  |  |  |  |  |
|  | (C3) KS760K-12 (PET) | Parts by mass |  |  |  |  |  |  |  |
|  | (C4) 2002 (PBT) | Parts by mass |  |  |  |  |  |  |  |
| Antioxidant | Irgafos 168 | Parts by mass | 0.10 | 0.10 | 0.10 | 0.10 | 0.10 | 0.10 | 0.10 |
|  | Irganox 1076 | Parts by mass | 0.10 | 0.10 | 0.10 | 0.10 | 0.10 | 0.10 | 0.10 |
| Content of PDMS block moiety in resins (A) + (B) |  | mass % | 4.8 | 0.0 | 4.8 | 2.4 | 3 | 3.6 | 4.2 |
| Evaluation | Optical characteristic | Tt % | 87 | 76 | 73 | 83 | 85 | 86 | 86 |
|  |  | Haze % | 3.1 | 64 | 14 | 23 | 15 | 9.3 | 5.0 |
|  |  | YI | 15 | — | — | −3.6 | −2.0 | 1.5 | 6.6 |
|  | Physical property | MFR (300° C., 1.2 kg) g/10 min | 11 | 18 | 12 | 16 | 16 | 14 | 13 |
|  |  | Q value (280° C., 160 kg) × 0.01 mL/s | 10 | 11 | 11 | 11 | 11 | 11 | 11 |
|  |  | Izod impact strength (23° C.) kJ/m² | 83 | — | — | 88 | 84 | 81 | 78 |
|  |  | Izod impact strength (0° C.) kJ/m² | 77 | — | — | 44 | 73 | 73 | 72 |
|  |  | Izod impact strength (−10° C.) kJ/m² | 71 | — | — | 16 | 18 | 19 | 20 |
|  |  | Izod impact strength (−20° C.) kJ/m² | — | — | — | — | — | — | — |
|  |  | Izod impact strength (−30° C.) kJ/m² | — | — | — | — | — | — | — |

TABLE 1-2-continued

| | | | Example 3 | Comparative Example 3-1 | Comparative Example 3-2 | Example 3-1 | Example 3-2 | Example 3-3 | Example 3-4 |
|---|---|---|---|---|---|---|---|---|---|
| | Izod impact strength (−40° C.) | kJ/m² | — | — | — | — | — | — | — |
| | HDT (1.83 MPa) | ° C. | 116 | 125 | 120 | 120 | 119 | 118 | 117 |
| Chemical resistance | 2 minutes after application of isobutyl acetate under strain of 1% | | A | B | A | A | A | A | A |

TABLE 2-1

| | | | Example 4 | Comparative Example 4-1 | Comparative Example 4-2 | Example 5 | Comparative Example 5-1 | Comparative Example 5-2 |
|---|---|---|---|---|---|---|---|---|
| Molecular weight of resin (A) + resin (B) | | | 17,700 | 17,700 | 17,700 | 18,900 | 18,900 | 18,900 |
| PC-POS copolymer (A) | (A1) n = 37 | Parts by mass | 75 | | | 60 | | |
| | (A2) n = 88 | Parts by mass | | | 75 | | | 60 |
| Aromatic PC resin (B) | (B1) FN2500 | Parts by mass | | | | 15 | | 15 |
| | (B2) FN2200 | Parts by mass | | | | | | |
| | (B3) FN1900 | Parts by mass | | | | | 57 | |
| | (B4) FN1700 | Parts by mass | | 75 | | | 18 | |
| Polyester-based resin (C) | (C1) J055 (PET) | Parts by mass | 25 | 25 | 25 | 25 | 25 | 25 |
| | (C2) J125 (PET) | Parts by mass | | | | | | |
| | (C3) KS760K-12 (PET) | Parts by mass | | | | | | |
| | (C4) 2002 (PBT) | Parts by mass | | | | | | |
| Antioxidant | Irgafos 168 | Parts by mass | 0.10 | 0.10 | 0.10 | 0.10 | 0.10 | 0.10 |
| | Irganox 1076 | Parts by mass | 0.10 | 0.10 | 0.10 | 0.10 | 0.10 | 0.10 |
| Content of PDMS block moiety in resins (A) + (B) | | mass % | 6.0 | 0.0 | 6.0 | 4.8 | 0.0 | 4.8 |
| Evaluation | Optical characteristic | Tt | % | 86 | 74 | 71 | 87 | 74 | 72 |
| | | Haze | % | 7.9 | 74 | 29 | 3.7 | 69 | 16 |
| | | YI | | 33 | — | — | 17 | — | — |
| | Physical property | MFR (300° C., 1.2 kg) | g/10 min | 11 | 21 | 13 | 10 | 17 | 11 |
| | | Q value (280° C., 160 kg) | × 0.01 mL/s | 11 | 11 | 11 | 10 | 10 | 10 |
| | | Izod impact strength (23° C.) | kJ/m² | 81 | — | — | 80 | — | — |
| | | Izod impact strength (0° C.) | kJ/m² | 75 | — | — | 21 | — | — |
| | | Izod impact strength (−10° C.) | kJ/m² | 18 | — | — | 18 | — | — |
| | | Izod impact strength (−20° C.) | kJ/m² | — | — | — | — | — | — |
| | | Izod impact strength (−30° C.) | kJ/m² | — | — | — | — | — | — |
| | | Izod impact strength (−40° C.) | kJ/m² | — | — | — | — | — | — |
| | | HDT (1.83 MPa) | ° C. | 113 | 122 | 117 | 115 | 123 | 119 |
| Chemical resistance | 2 minutes after application of isobutyl acetate under strain of 1% | | A | B | A | A | B | A |

TABLE 2-2

| | | | Example 6 | Comparative Example 6-1 | Comparative Example 6-2 | Example 7 | Comparative Example 7-1 | Comparative Example 7-2 |
|---|---|---|---|---|---|---|---|---|
| Molecular weight of resin (A) + resin (B) | | | 20,600 | 20,600 | 20,600 | 18,400 | 18,400 | 18,400 |
| PC-POS copolymer (A) | (A1) n = 37 | Parts by mass | 37.5 | | | 64 | | |
| | (A2) n = 88 | Parts by mass | | | | | | |
| Aromatic PC resin (B) | (B1) FN2500 | Parts by mass | 37.5 | | 37.5 | | | 64 |
| | (B2) FN2200 | Parts by mass | | | 37.5 | | | |
| | (B3) FN1900 | Parts by mass | | 43 | | | 16 | 16 | 16 |
| | (B4) FN1700 | Parts by mass | | 32 | | | | |

TABLE 2-2-continued

|  |  |  | Example 6 | Comparative Example 6-1 | Comparative Example 6-2 | Example 7 | Comparative Example 7-1 | Comparative Example 7-2 |
|---|---|---|---|---|---|---|---|---|
| Polyester-based resin (C) | (C1) J055 (PET) | Parts by mass |  |  |  |  | 64 |  |
|  | (C2) J125 (PET) | Parts by mass | 25 | 25 | 25 |  |  |  |
|  | (C3) KS760K-12 (PET) | Parts by mass |  |  |  | 20 | 20 | 20 |
|  | (C4) 2002 (PBT) | Parts by mass |  |  |  |  |  |  |
| Antioxidant | Irgafos 168 | Parts by mass | 0.10 | 0.10 | 0.10 | 0.10 | 0.10 | 0.10 |
|  | Irganox 1076 | Parts by mass | 0.10 | 0.10 | 0.10 | 0.10 | 0.10 | 0.10 |
| Content of PDMS block moiety in resins (A) + (B) |  | mass % | 3.0 | 0.0 | 3.0 | 4.8 | 0.0 | 4.8 |
| Evaluation | Optical characteristic | Tt % | 85 | 74 | 75 | 86 | 75 | 73 |
|  |  | Haze % | 16 | 65 | 18 | 3.1 | 58 | 14 |
|  |  | YI | −1.7 | — | — | 15 | — | — |
|  | Physical property | MFR (300° C., 1.2 kg) g/10 min | 9 | 13 | 10 | 14 | 23 | 16 |
|  |  | Q value (280° C., 160 kg) × 0.01 mL/s | 7 | 8 | 7 | 13 | 14 | 14 |
|  |  | Izod impact strength (23° C.) kJ/m$^2$ | 91 | — | — | 75 | — | — |
|  |  | Izod impact strength (0° C.) kJ/m$^2$ | 24 | — | — | 69 | — | — |
|  |  | Izod impact strength (−10° C.) kJ/m$^2$ | 18 | — | — | 54 | — | — |
|  |  | Izod impact strength (−20° C.) kJ/m$^2$ | — | — | — | — | — | — |
|  |  | Izod impact strength (−30° C.) kJ/m$^2$ | — | — | — | — | — | — |
|  |  | Izod impact strength (−40° C.) kJ/m$^2$ | — | — | — | — | — | — |
|  |  | HDT (1.83 MPa) ° C. | 119 | 124 | 21 | 116 | 124 | 119 |
|  | Chemical resistance | 2 minutes after application of isobutyl acetate under strain of 1% | A | B | B | A | B | A |

TABLE 3-1

|  |  |  | Example 8 | Comparative Example 8-1 | Comparative Example 8-2 | Example 9 | Comparative Example 9-1 | Comparative Example 9-2 |
|---|---|---|---|---|---|---|---|---|
| Molecular weight of resin (A) + resin (B) |  |  | 17,000 | 17,000 | 17,000 | 20,600 | 20,600 | 20,600 |
| PC-POS copolymer (A) | (A1) n = 37 | Parts by mass | 75 |  |  | 37.5 |  |  |
|  | (A2) n = 88 | Parts by mass |  |  | 75 |  |  | 37.5 |
| Aromatic PC resin (B) | (B1) FN2500 | Parts by mass |  |  |  | 37.5 | 37.5 | 37.5 |
|  | (B2) FN2200 | Parts by mass |  |  |  |  |  |  |
|  | (B3) FN1900 | Parts by mass |  |  |  |  |  |  |
|  | (B4) FN1700 | Parts by mass |  | 75 |  |  | 37.5 |  |
| Polyester-based resin (C) | (C1) J055 (PET) | Parts by mass |  |  |  |  |  |  |
|  | (C2) J125 (PET) | Parts by mass | 25 | 25 | 25 | 25 | 25 | 25 |
|  | (C3) KS760K-12 (PET) | Parts by mass |  |  |  |  |  |  |
|  | (C4) 2002 (PBT) | Parts by mass |  |  |  |  |  |  |
| Antioxidant | Irgafos 168 | Parts by mass | 0.10 | 0.10 | 0.10 | 0.10 | 0.10 | 0.10 |
|  | Irganox 1076 | Parts by mass | 0.10 | 0.10 | 0.10 | 0.10 | 0.10 | 0.10 |
| Content of PDMS block moiety in resins (A) + (B) |  | mass % | 6.0 | 6.0 | 0.0 | 3.0 | 0.0 | 3.0 |
| Evaluation | Optical characteristic | Tt % | 85 | 74 | 71 | 85 | 76 | 75 |
|  |  | Haze % | 8.3 | 72 | 27 | 17 | 65 | 19 |
|  |  | YI | 33 | — | — | −1.2 | — | — |
|  | Physical property | MFR (300° C., 1.2 kg) g/10 min | 14 | 27 | 16 | 12 | 16 | 12 |
|  |  | Q value (280° C., 160 kg) × 0.01 mL/s | 16 | 17 | 17 | 11 | 11 | 11 |
|  |  | Izod impact strength (23° C.) kJ/m$^2$ | 68 | — | — | 95 | — | — |
|  |  | Izod impact strength (0° C.) kJ/m$^2$ | 21 | — | — | 78 | — | — |
|  |  | Izod impact strength (−10° C.) kJ/m$^2$ | 18 | — | — | 21 | — | — |
|  |  | Izod impact strength (−20° C.) kJ/m$^2$ | — | — | — | — | — | — |
|  |  | Izod impact strength (−30° C.) kJ/m$^2$ | — | — | — | — | — | — |

TABLE 3-1-continued

| | | | Examples and Comparative Examples | | | | | |
|---|---|---|---|---|---|---|---|---|
| | | | Example 8 | Comparative Example 8-1 | Comparative Example 8-2 | Example 9 | Comparative Example 9-1 | Comparative Example 9-2 |
| | Izod impact strength (−40° C.) | kJ/m² | — | — | — | — | — | — |
| | HDT (1.83 MPa) | ° C. | 112 | 122 | 116 | 118 | 123 | 120 |
| Chemical resistance | 2 minutes after application of isobutyl acetate under strain of 1% | | A | B | A | A | A | A |

TABLE 3-2

| | | | Examples and Comparative Examples | | | | | |
|---|---|---|---|---|---|---|---|---|
| | | | Example 10 | Comparative Example 10-1 | Comparative Example 10-2 | Example 11 | Reference Example 1 | Reference Example 2 |
| Molecular weight of resin (A) + resin (B) | | | 18,400 | 18,400 | 18,400 | 17,700 | 17,700 | 17,700 |
| PC-POS copolymer (A) | (A1) n = 37 | Parts by mass | 64 | | | 90 | | |
| | (A2) n = 88 | Parts by mass | | | 64 | | | 100 |
| Aromatic PC resin (B) | (B1) FN2500 | Parts by mass | | | | | | |
| | (B2) FN2200 | Parts by mass | 16 | 16 | 16 | | | |
| | (B3) FN1900 | Parts by mass | | | | | | |
| | (B4) FN1700 | Parts by mass | | 64 | | | 100 | |
| Polyester-based resin (C) | (C1) J055 (PET) | Parts by mass | | | | | | |
| | (C2) J125 (PET) | Parts by mass | | | | | | |
| | (C3) KS760K-12 (PET) | Parts by mass | 20 | 20 | 20 | | | |
| | (C4) 2002 (PBT) | Parts by mass | | | | 10 | | |
| Antioxidant | Irgafos 168 | Parts by mass | 0.10 | 0.10 | 0.10 | 0.10 | 0.10 | 0.10 |
| | Irganox 1076 | Parts by mass | 0.10 | 0.10 | 0.10 | 0.10 | 0.10 | 0.10 |
| Content of PDMS block moiety in resins (A) + (B) | | mass % | 4.8 | 0.0 | 4.8 | 6.0 | 0.0 | 6.0 |
| Evaluation | Optical characteristic | Tt | % | 86 | 75 | 73 | 86 | 90 | 89 |
| | | Haze | % | 3.2 | 57 | 14 | 2.0 | 0.3 | 0.3 |
| | | YI | | 14 | — | — | 11 | 1.4 | 3.8 |
| | Physical property | MFR (300° C., 1.2 kg) | g/10 min | 14 | 23 | 15 | 19 | 24 | 12 |
| | | Q value (280° C., 160 kg) | × 0.01 mL/s | 13 | 14 | 14 | 16 | 12 | 12 |
| | | Izod impact strength (23° C.) | kJ/m² | 69 | — | — | 60 | 75 | 67 |
| | | Izod impact strength (0° C.) | kJ/m² | 60 | — | — | 59 | 69 | 65 |
| | | Izod impact strength (−10° C.) | kJ/m² | 18 | — | — | 49 | 37 | 61 |
| | | Izod impact strength (−20° C.) | kJ/m² | — | — | — | — | 15 | 58 |
| | | Izod impact strength (−30° C.) | kJ/m² | — | — | — | — | 13 | 51 |
| | | Izod impact strength (−40° C.) | kJ/m² | — | — | — | — | 11 | 24 |
| | | HDT (1.83 MPa) | ° C. | 116 | 124 | 119 | 104 | 131 | 121 |
| | Chemical resistance | 2 minutes after application of isobutyl acetate under strain of 1% | | A | B | A | A | B | B |

[Evaluation Test]
<Total Light Transmittance: Tt (%)>

The total light transmittance of a test piece having a thickness of 3 mm was measured in conformity with ISO 14782:1999. NDH 2000 manufactured by Nippon Denshoku Industries Co., Ltd. was used as a measuring apparatus. The above-mentioned test piece for a transparency evaluation test was used as a test piece.

<Haze Value>

The haze value of a test piece having a thickness of 3 mm was measured in conformity with ISO 14782:1999. As the haze value becomes smaller, the transparency of the test piece is improved:

$$\text{Haze (\%)} = Td/Tt \times 100$$

wherein Td represents a diffuse transmittance and Tt represents a total light transmittance.

<YI Value>

The YI value of a test piece having a thickness of 3 mm was measured with a spectrophotometer "U-4100" (manufactured by Hitachi High-Technologies Corporation) under the conditions of a C light source and a two-degree field of view.

<Fluidity Evaluation: MFR>

The amount (g/10 min) of a molten resin flowing out of a die having a diameter of 2.095±0.005 mm and a length of 8.000±0.025 mm was measured by using the above-mentioned pellet in conformity with JIS K 7210-1:2014 at 300° C. under a load of 1.2 kg.

<Q Value (Flow Value) [Unit; $10^{-2}$ mL/sec]>

The amount ($10^{-2}$ mL/sec) of a molten resin flowing out of a nozzle having a diameter of 1.00 mm and a length of 10.00 mm was measured by using the above-mentioned pellet and a Koka flow tester in conformity with JIS K 7210-1:2014: Appendix JA at 280° C. under a pressure of 160 kgf. A Q value represents an outflow amount per unit time, and a higher numerical value therefor means that the fluidity of the resin is better.

<Impact Resistance>

The pellet obtained in the foregoing was dried at 100° C. for 8 hours, and was then subjected to injection molding with an injection molding machine (manufactured by Nissei Plastic Industrial Co., Ltd., NEX110, screw diameter: 36 mmφ) at a cylinder temperature of 280° C. and a die temperature of 80° C. to produce an Izod test piece (length: 63.5 mm, width: 12.7 mm, thickness: 3.2 mm). Notched Izod impact strengths at −40° C., −30° C., −20° C., −10° C., 0° C., and 23° C. were measured by using a test piece obtained by making a notch (r=0.25 mm±0.05 mm) in the test piece through post-processing in conformity with ASTM Standard D-256.

<Deflection Temperature Under Load: HDT (Unit; ° C.)>

The pellet obtained in the foregoing was dried at 100° C. for 8 hours, and was then subjected to injection molding with an injection molding machine (manufactured by Nissei Plastic Industrial Co., Ltd., NEX110, screw diameter: 36 mmφ) at a cylinder temperature of 280° C. and a die temperature of 80° C. to provide a test piece (length: 127 mm, width: 12.7 mm, thickness: 3.2 mm). A load of 1.83 MPa was applied to the test piece in conformity with ASTM Standard D-648 at a rate of temperature increase of 120° C./h and a fulcrum-to-fulcrum distance of 100 mm, and the temperature at which the deflection of the test piece measured in an edgewise manner reached 0.26 mm was recorded.

<Chemical Resistance to Isobutyl Acetate>

The pellet obtained in the foregoing was subjected to injection molding at a molding temperature of 280° C. and a die temperature of 80° C. to provide a test piece measuring 127 mm long by 12.7 mm wide by 3.2 mm thick. A strain of 1.0% was applied to the test piece by a three-point bending test method at a span distance of 80 mm, and then isobutyl acetate was applied thereto with a swab. The test piece was left to stand at 23° C. for 2 minutes, and then a change in appearance thereof was observed, followed by an evaluation in accordance with the following criteria.

A case in which the sample was free of any appearance change or a fine crack occurred on its surface was indicated by Symbol "A".

A case in which a crack arrived from the surface of the sample to the opposite surface thereof in the thickness direction thereof was indicated by Symbol "B".

INDUSTRIAL APPLICABILITY

The polycarbonate-based resin composition obtained in the present invention can be suitably used in casings and the like for parts for electrical and electronic equipment, and parts and the like for an automobile and a building material because the composition is excellent in impact resistance.

The invention claimed is:

1. A polycarbonate-based resin composition, comprising:
50 mass% or more to 99 mass% or less of a polycarbonate-based resin (S) consisting of 0.1 mass% or more to 100 mass% or less of a polycarbonate- polyorganosiloxane copolymer (A), which contains a polycarbonate block (A-1) formed of a repeating unit represented by the following general formula (I) and a polyorganosiloxane block (A-2) containing a repeating unit represented by the following general formula (II), and 0 mass% or more to 99.9 mass% or less of an aromatic polycarbonate-based resin (B) except the polycarbonate-polyorganosiloxane copolymer (A); and
1 mass% or more to 50 mass% or less of a polyester-based resin (C), wherein
the aromatic polycarbonate-based resin (B) comprises a homopolycarbonate-based resin,
the polyester-based resin (C) is not a copolymer,
the polyorganosiloxane block (A-2) has an average chain length of from 20 or more to less than 50, and
a 3-millimeter thick plate formed of the polycarbonate-based resin composition has a total light transmittance of 80% or more:

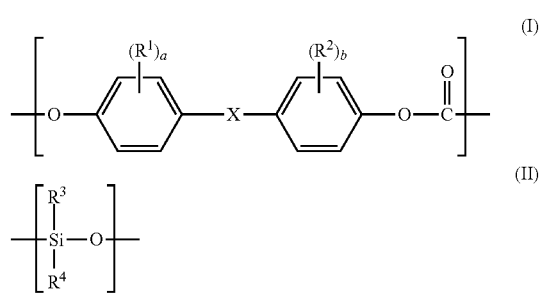

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO2—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and "a" and "b" each independently represent an integer of from 0 to 4 wherein the polycarbonate-based resin composition is free of an inorganic filler and the polycarbonate-based resin composition does not comprise a polycarbonate-based resin other than the polycarbonate-based resin (S).

2. The polycarbonate-based resin composition according to claim 1, wherein the aromatic polycarbonate-based resin (B) contains a polycarbonate block including, in a main chain thereof, a repeating unit represented by the following general formula (III):

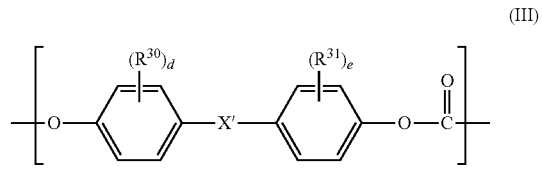

wherein $R^{30}$ and $R^{31}$ each independently represent a halogen atom, an alkyl group having 1 to 6 carbon atoms, or an alkoxy group having 1 to 6 carbon atoms, X' represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, 13 S—, —SO—, —SO$_2$—, —O—, or —CO—, and "d" and "e" each independently represent an integer of from 0 to 4.

3. The polycarbonate-based resin composition according to claim 1, wherein a content of the polyorganosiloxane block (A-2) in the polycarbonate-polyorganosiloxane copolymer (A) is from 1 mass% or more to 12 mass% or less.

4. The polycarbonate-based resin composition according to claim 1, wherein a content of the polyorganosiloxane block (A-2) in the polycarbonate-based resin (S) is from 0.1 mass% or more to 10 mass% or less.

5. The polycarbonate-based resin composition according to claim 1, wherein the polycarbonate-polyorganosiloxane copolymer (A) has a viscosity-average molecular weight (Mv) of from 9,000 or more to 50,000 or less.

6. The polycarbonate-based resin composition according to claim 1, wherein the polycarbonate-based resin (S) has a viscosity-average molecular weight (Mv) of from 9,000 or more to 50,000 or less.

7. The polycarbonate-based resin composition according to claim 1, wherein the polyester-based resin (C) comprises at least one selected from a polyethylene terephthalate and a polybutylene terephthalate.

8. The polycarbonate-based resin composition according to claim 7, wherein the polyester-based resin (C) is a polyethylene terephthalate.

9. The polycarbonate-based resin composition according to claim 1, wherein the polycarbonate-based resin composition is free of a fluorine-containing flame retardant aid.

10. A molded article, which is obtained by molding the polycarbonate-based resin composition of claim 1.

11. The molded article according to claim 10, wherein the molded article comprises exterior and internal parts for parts for electrical and electronic equipment.

12. The molded article according to claim 10, wherein the molded article comprises parts for an automobile and a building material.

* * * * *